(12) United States Patent
Daoud

(10) Patent No.: US 6,249,580 B1
(45) Date of Patent: Jun. 19, 2001

(54) UPGRADABLE CUSTOMER BRIDGE

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/264,790

(22) Filed: Mar. 9, 1999

(51) Int. Cl.⁷ ...................................................... H04M 1/00
(52) U.S. Cl. .............................................................. 379/399
(58) Field of Search ................................... 379/399, 412, 379/442, 387, 438; 439/417, 402, 413, 397, 711

(56) References Cited

U.S. PATENT DOCUMENTS

| | | |
|---|---|---|
| 3,611,264 | 10/1971 | Ellis . |
| 4,662,699 | 5/1987 | Vachhani et al. . |
| 4,793,823 | 12/1988 | Cozzens et al. . |
| 5,153,910 | * 10/1992 | Miekelson et al. .................. 379/399 |
| 5,240,432 | 8/1993 | Daoud . |
| 5,637,011 | 6/1997 | Meyerhoefer et al. . |
| 5,860,829 | 1/1999 | Hower et al. . |

OTHER PUBLICATIONS

Technical Data Sheet of A.C. Egerton Limited, related to Mini Rocker Cross Connection Cabinets.

* cited by examiner

Primary Examiner—Jack Chiang
(74) Attorney, Agent, or Firm—Stroock & Stroock & Lavan LLP

(57) ABSTRACT

A bridge for use in a junction box wherein the junction box receives a first wire pair coupled to a central office and at least two device wire pairs coupled to a local telephone device. The bridge includes a body and a first socket disposed in the body for receiving the first wire pair. At least two connector sockets are disposed in the body with each of the connector sockets being dimensioned and shaped so as to receive one device wire pair. A test socket is disposed in the body adjacent the first socket. A connecting wire pair is disposed in the body with the connecting wire having one end adjacent each of the two connector sockets. The test socket receives a second end of the connecting wire pair for coupling the connecting wire pair to the first wire pair inserted in the first socket. When each of the device wire pairs are inserted in one of the at least two connector sockets, each of the device wire pairs is coupled to the first wire pair.

25 Claims, 3 Drawing Sheets

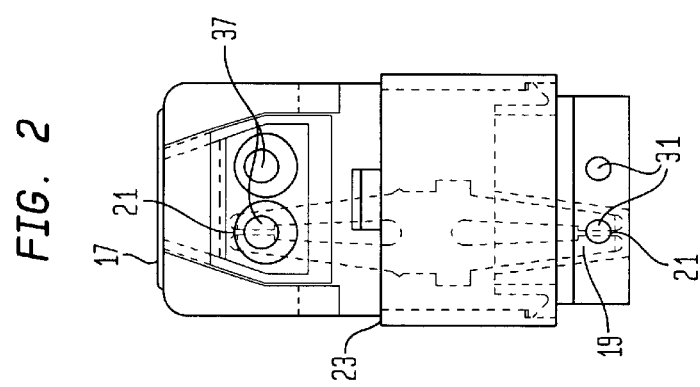
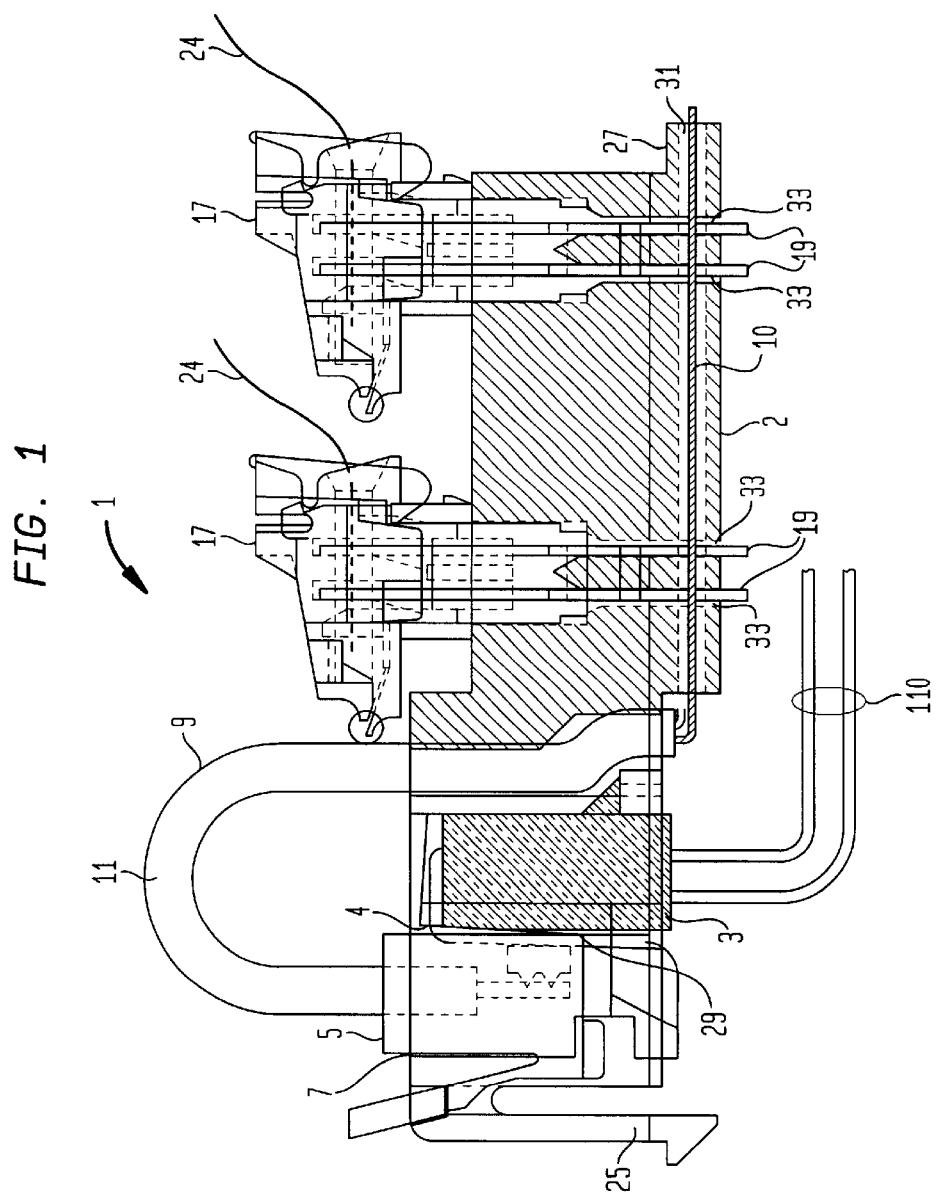

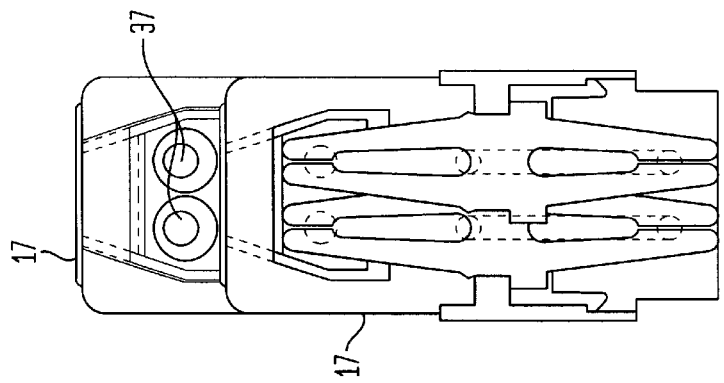
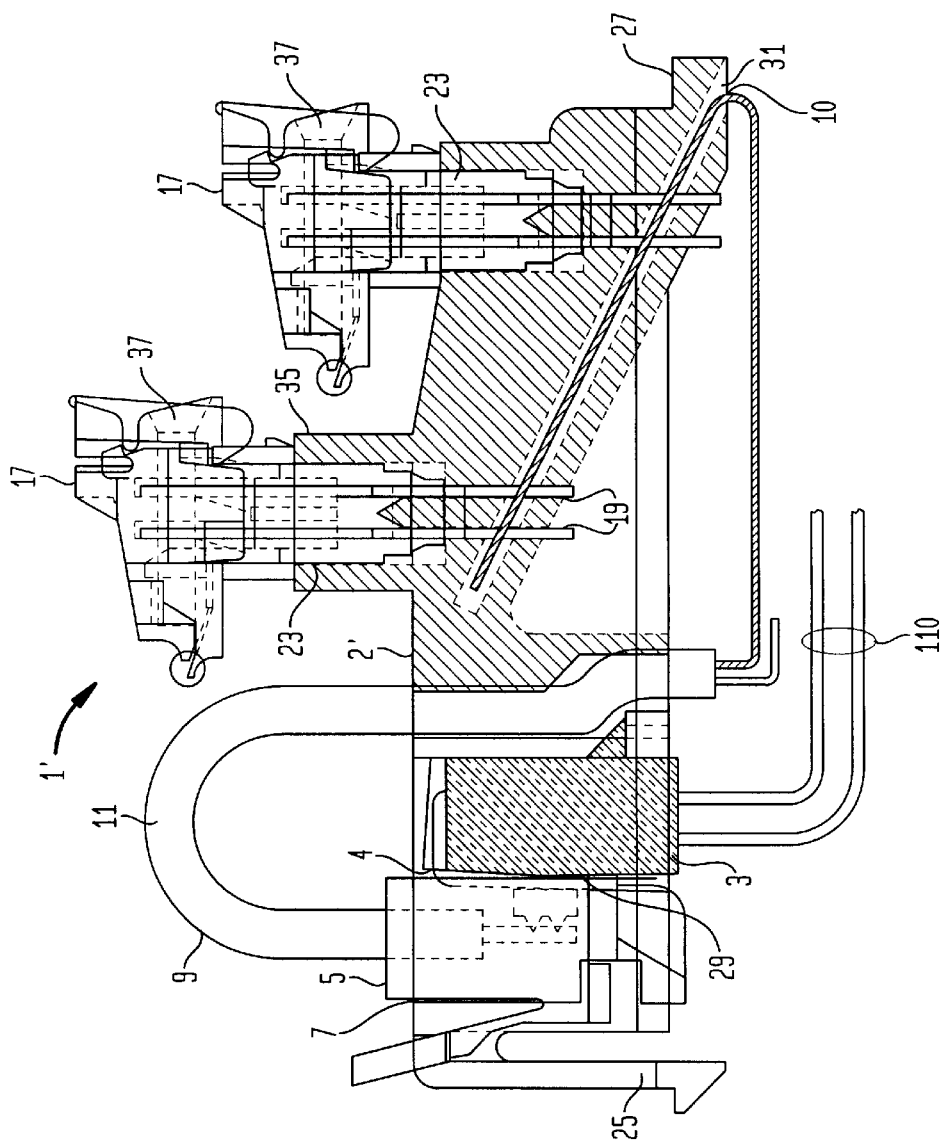

UPGRADABLE CUSTOMER BRIDGE

FIELD OF THE INVENTION

This invention relates generally to the field of telephone wire connectors and distribution systems and, in particular, to an upgradeable customer bridge for use in a junction box.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multiconductor cable, the individual tip ring wire pairs must first be broken out from the cable into individual wire pairs. This is normally accomplished in a junction box known as, for example, a building entrance protector (BEP), or network interface unit (NIU). Within such devices the individual telephone line tip ring pairs are separated from the cable, individually connected to a connector block, and made available for further electrical connection and distribution. Usually, there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard wired to a first connector block which provides a first test point for testing the telephone line connections between the building and telephone central office. This first terminal block is hard wired to a multi pair connector, most typically a twenty-five pair connector of the RJ21 type, for further connection to an array of customer bridges which are also hard wired and connectorized via a mating RJ21 connector. A plurality of customer bridges are placed in the junction box which enables a subscriber to easily disconnect terminal equipment, such as a telephone device, from a telephone line so that the subscriber can isolate troubles on the line as originating in the telephone network, or on the terminal equipment side of the telephone line. An example of such an arrangement is shown in U.S. Pat. No. 5,363,440, dated Nov. 8, 1994, the disclosure of which is incorporated herein by reference. Presently known customer bridges utilize screw-type binding post connectors for the attachment of the subscriber device wiring, which are labor intensive to wire.

Often, telephone devices installed at a particular location are serially connected to a single wire pair run connected to a customer bridge. This may be accomplished by routing a twisted pair from the particular customer bridge in the junction box to a telephone device at a first location and from the first telephone device location to a second telephone device location and so on. However, a drawback with serially configuring multiple telephone devices in such manner is that if a failure occurs anywhere along the chain each of the wiring segments between each of the telephone devices must be separately tested to locate the fault. It is possible to couple more than one telephone device to a customer bridge in parallel by connecting multiple wires to each of the post connectors on the customer bridge. Such a configuration, however, is undesirable because connecting more than one wire to a single post connector, especially wires of different gauges, results in an unreliable connection. Accordingly, it is desirable to provide a wiring system that supports multiple telephone devices from a single customer bridge in which troubleshooting is simplified.

SUMMARY OF THE INVENTION

The present invention is directed at overcoming the shortcomings of the prior art. The present invention is directed to a customer bridge for use in a junction box wherein the junction box receives a first telephone line wire pair coupled to a central office telephone line and at least two device wire pairs individually connectable to the customer bridge for coupling to local telephone devices. The bridge includes a body and a first socket disposed in the body for receiving the telephone line wire pair. One or more connector sockets are disposed in the body with each of the connector sockets being dimensioned and shaped so as to receive one device wire pair. An RJ11 test jack and receptacle of a known type is disposed in the body adjacent the sockets. A connecting bridge wire pair is disposed in the body with the connecting wire having a first section and a second section. The first section is positioned in the body so as to be adjacent with and beneath each of the at least two connector sockets. The test socket receives the RJ11 jack-fitted second section of the connecting bridge wire pair thereby electrically coupling the connecting bridge wire pair to the telephone line wire pair inserted in the first socket, in a manner known in the art of customer bridges. As a result, when a device wire pair is inserted in one of the at least two connector sockets, it is coupled to the telephone line wire pair. By using the bridge of the present invention, each local telephone device can be individually and directly connected to the bridge without the need to daisy-chain together multiple telephone devices. As a result, the process of determining the location of a wiring fault between the telephone devices and the junction box is greatly simplified. Moreover, because the bridge preferably accepts a plug in connector, the bridge may be flexibly field-configured with different types and quantities of connectors to meet application-specific wiring needs.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 1 is a side elevational view of a bridge made in accordance with the present invention;

FIG. 2 is a front view of an insulation displacement connector inserted in the bridge of FIG. 1;

FIG. 3 is a side elevational view of a bridge made in accordance with an alternate embodiment of the present invention;

FIG. 4 is a front elevational view of an insulation displacement connector inserted in the bridge of FIG. 3.

DETAILED DESCRIPTION OF THE PREFERRED EMBODIMENTS

Figure 5:
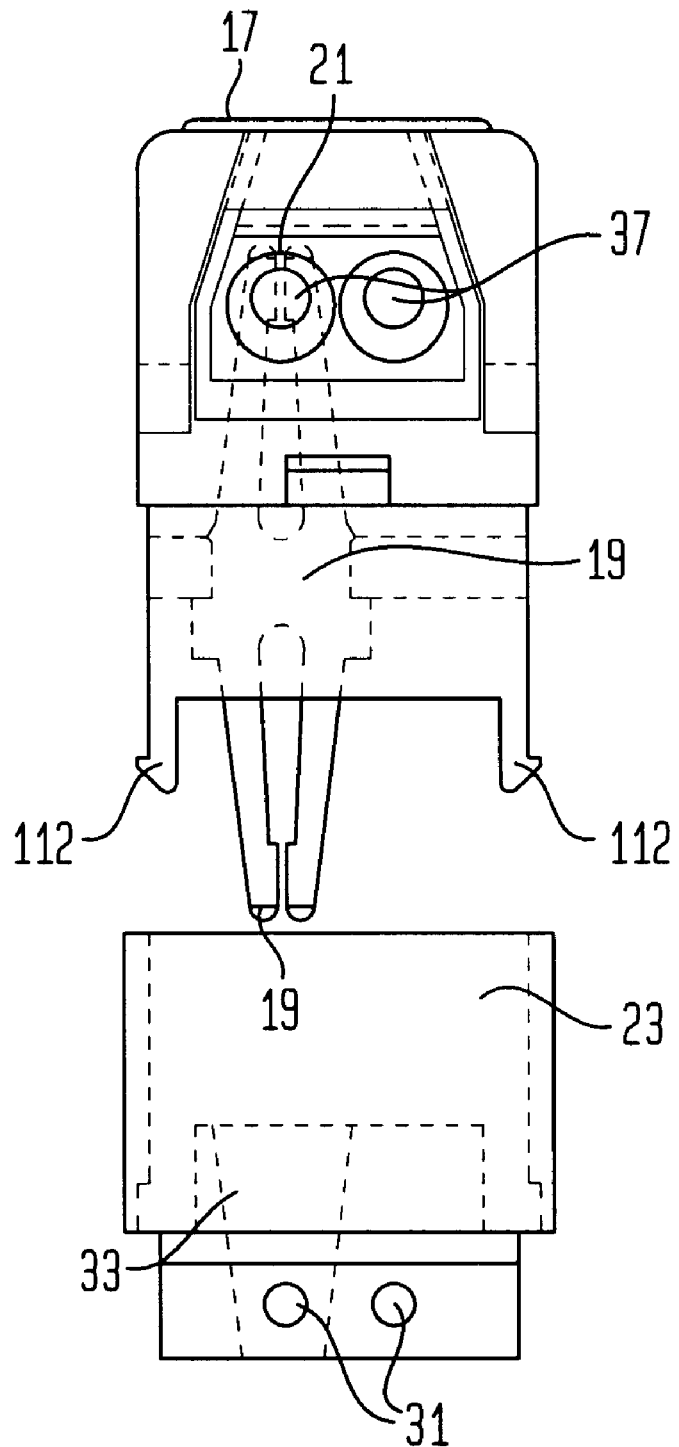
FIG. 5 is a front elevational view of the insulation displacement connector of FIG. 2 prior to insertion into the bridge of FIG. 1.

Referring now to FIG. 1, there is shown a customer bridge 1 of the present invention.

Bridge 1 includes a body 2 that contains a first socket 4 for receiving a first telephone line wire pair 110 that is coupled to a central office, PBX or other communication device or system (not shown). In an exemplary embodiment, first wire pair 110 is terminated in a 645 type plug connector 3 and first socket 4 is a 645 type plug receptacle dimensioned and shaped to selectively receive 645 type plug connector 3, in a manner known in the art.

Body 1 also includes at least two connector sockets 23 each of which is used for connecting a telephone device to bridge 1 via a device wire pair 24. Connector sockets 23 may be of any design capable of coupling bridge 1 to device wire pairs 24, provided that the connector inserted therein is capable of receiving both wires of a device wire pair. In an exemplary embodiment, connector sockets 23 are each dimensioned and shaped to receive an insulation displacement connector (IDC) 17. Each IDC 17 has a pair of wire insertion holes 37 for receiving a device wire pair 24 thereby facilitating the selective coupling of one or more device wire pairs 24 to bridge 1. In the exemplary embodiment, connector sockets 23 will each include a pair of terminal openings 33 for receiving a terminal pair 19 of IDC 17. In an exemplary embodiment, terminal pair 19 is a double-sided IDC terminal strip having a wire insertion point 21 at each end (see FIGS. 2 and 5). Body 2 also includes a channel 31 that intersects and communicates with terminal openings 33 of connector sockets 23. The IDC may be any type known in the art, in addition to the mini-rocker type IDC shown in the preferred embodiment herein. Preferably, IDC 17 may be selectively removeable and insertable into socket 23 by snap fit tabs 112 (FIG. 5) although the specific means and methods for securing connector 17 within socket 23 is a matter of design choice. Moreover, connector 17 need not be an IDC type connector. Additionally, in an exemplary embodiment, body 2 includes a depressable insertion tab 25 and a flange 27 that allows for the selective insertion of bridge 1 in a junction box.

A connecting bridge wire pair 9 is disposed in body 2 and has a first section 10 and a second section 11. First section 10 of connecting wire pair 9 is disposed in channel 31 of body 2 in a manner such that when IDCs 17 are inserted into connecting sockets 23, each wire of first section 10 of connecting wire pair 9 enters wire insertion point 21 of one of terminal pair 19 for each of IDCs 17 thereby forming an electrical and mechanical connection therewith.

A test socket 7 is disposed on body 2 in a position that is adjacent first socket 4. Second section 11 of connecting wire pair 9, coupled to first section 10, extends out from body 2 and is of sufficient length to be coupled to test socket 7. Second section 11 is terminated in a connecting bridge wire pair connector 5. In an exemplary embodiment, second section 11 of connecting wire pair 9 is terminated in an RJ-11 type jack connector 5 and test socket 7 is an RJ-11 type receptacle dimensioned and shaped to receive an RJ-11 connector.

When connecting wire pair connector 5 is inserted in test socket 7, connector 5 forms an electrical connection through connecting bridge wire pair 9 with connector 3 at a contact point 29. As a result of this electrical connection, device wire pairs 24 that are connected to IDCs 17 inserted into connection sockets 23 are electrically coupled to first wire pair 110. Therefore, each telephone device (not shown) connected via device wire pair 24 is individually and directly connected to bridge 1 and thus in turn electrically coupled to the central office via telephone line wire pair 110. Accordingly, because each telephone device is wired individually and directly to bridge 1, the process of locating electrical faults in the telephone devices or in device wire pairs 24 is simplified.

Test socket 7 may also be used to test the integrity of first wire pair 110. To perform such a test, connecting wire pair connector 5 is removed from test socket 7 and a testing device (not shown) capable of performing telephone line tests with the central office over first wire pair 110 is inserted into test socket 7.

Although FIG. 1 depicts bridge 1 having only two connector sockets 23, bridge 1 may include more or less than two connector sockets 23. For example, bridge 1 may include three connector sockets for receiving IDCs in which case three telephone devices can be individually and directly coupled to bridge 1. Also, if desired, each of the IDCs may also be selected to support a different gauge wire. Furthermore, a particular junction box in which customer bridges 1 are installed may upgraded to include bridges 1 each having a different number of connector sockets 23 each supporting a different number of telephone devices. By using customer bridges in this manner, the junction box can be easily upgraded to support additional direct connections to a wide variety of telephone devices.

Referring now to FIGS. 3 and 4, there is shown a bridge 1' according to an alternative embodiment of the present invention. Elements of bridge 1' that are similar to elements of bridge 1 of FIG. 1 will be identically labeled and a detailed description thereof will be eliminated. In bridge 1', body 2' is dimensioned and shaped so that each of IDCs 17 that are inserted into connector sockets 23 are at different heights along the length of the bridge. By positioning each of IDCs 17 at different heights, wire insertion holes 37 of each IDC 17 are more visible and hence easily distinguishable and accessible, thereby simplifying the selective coupling of device wire pairs 24 to IDCs 17. In an exemplary embodiment, a neck 35 is disposed on body 2 and surrounds one of connecting sockets 23. When one of IDCs 17 is inserted in the one of connecting sockets 23 having neck 35, the one of IDCs 17 is raised above the other of IDCs 17 so that easy access to wire insertion holes of each of IDCs 17 is provided. In order that first section 10 of connecting wire pair 9 be in electrical contact with each of IDCs 17, first section 10 is disposed in a channel 31' that is angularly disposed in body 2 so that terminal pairs 19 of each of IDCs 17 intersect channel 31' and electrically couple with first section 10 of connecting wire 9. Although FIG. 3 depicts bridge 1' having only two connecting sockets 23 positioned at different heights, it is obvious that bridge 1' may be formed to support more than two connecting sockets 23 each of which are positioned at different heights.

In all embodiments, body 2 is preferably formed of a molded synthetic resinous material with good insulating properties and mechanical strength. The specific materials utilized in constructing body 2 are an application specific matter of design choice within the knowledge of the person of skill familiar with connectors utilized in the telephony art. Moreover, as the IDC may be a snap-in type connector as shown, (although a fixed connector may also be used), the bridge may be readily field or factory modified by selectively removing one type of snap-in connector for replacement with another type of connector, as design needs warrant.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A customer bridge comprising:
   a body;
   a first socket disposed in said body for receiving a first wire pair;
   at least two connector sockets disposed in said body, each of said two connector sockets having therein a removable connector for receiving a device wire pair;
   a connecting wire pair having a first section and a second section, said first section being disposed in said body adjacent each of said two connector sockets and extending out from said body; and
   a test socket disposed in said body for selectively receiving said second section of said connecting wire pair and coupling said connecting wire pair to said first wire pair inserted in said first socket, such that when a device wire pair is inserted in one of said at least two connectors said device wire pair is coupled to said first wire pair.

2. The bridge of claim 1, wherein each of said at least two connector sockets are dimensioned and shaped to receive an insulation displacement connector having a terminal strip pair, and wherein when said insulation displacement connector is inserted into one of said at least two removable connector sockets, each terminal of said terminal pair couples with a respective one wire of said connecting wire pair.

3. The bridge of claim 1, wherein said body has a first end and a second end and said body has a depressable insertion tap disposed on said first end and a flange disposed on said second end so that said bridge is selectively insertable in said junction box.

4. The bridge of claim 1, wherein said second section of said connecting wire is terminated in a second connector and said test socket is dimensioned and shaped to selectively receive said second connector.

5. The bridge of claim 4, wherein said second connector is on RJ-11 connector.

6. The bridge of claim 1, wherein a first of said at least two connector sockets is offset in height relative to a second of said at least two connector sockets.

7. The bridge of claim 1, wherein said body is formed of molded synthetic resinous material.

8. The bridge of claim 1, wherein said first wire pair is coupled to a central office.

9. The bridge of claim 1, wherein the device wire pair is coupled to a terminal device.

10. A junction box comprising a plurality of bridges, said bridges further comprising:
    a body;
    a first socket disposed in said body for receiving a first wire pair disposed in said junction box;
    at least two connector sockets disposed in said body, each of said two connector sockets having therein a removable connector for receiving a device wire pair;
    a connecting wire pair having a first section and a second section, said first section being disposed in said body adjacent each of said two connector sockets and extending out from said body; and
    a test socket disposed in said body for selectively receiving said second section of said connecting wire pair and coupling said connecting wire pair to said first wire pair inserted in said first socket;
    wherein when said device wire pair is inserted in one of said at least two removable connectors, said device wire pair is coupled to said first wire pair.

11. A customer bridge comprising:
    a bridge body, said body housing on one side thereof a 645-type line plug receptacle having a 645 line plug insertable therein, a telephone line wire pair connected to and emerging from said line plug,
    an RJ-11 type jack receptacle housed on an opposite side of said body and having an RJ-11 type jack insertable therein, a bridge wire pair connected to and emerging from said jack, each wire of said bridge wire pair passing from said jack and through a respective channel in said body, an electrical connection being formed between said telephone wire pair and said bridge wire pair when said line plug and said jack are inserted into their respective receptacles; and
    a connector receptacle in fluid communication with said respective channels for selectively receiving a connector having a pair of terminal strips, each of which, upon insertion of said connector into said connector receptacle, electrically and mechanically connects to a respective one wire of said bridge wire pair for selective connection of a telephone device wire pair to said bridge through said connector so as to connect said device wire pair to said telephone line wire pair through said bridge wire pair.

12. The bridge of claim 11, wherein said connector is selectively insertable into and removable from said bridge.

13. The bridge of claim 11, wherein said connector is an insulation displacement connector.

14. The bridge of claim 13, wherein said insulation displacement connector is a mini-rocker type insulation displacement connector.

15. The bridge of claim 11, wherein said bridge has a length dimension, a width dimension and a height dimension, and wherein said bridge comprises a plurality of connectors oriented along said length dimension, at least one connector being offset from said bridge body along said height dimension relative to the remainder of said plurality of connectors.

16. A customer bridge comprising:
    a bridge body, said body housing on one side thereof a line plug receptacle having a line plug insertable therein, a telephone line wire pair connected to and emerging from said line plug,
    a jack receptacle housed on an opposite side of said body and having a jack insertable therein, a bridge wire pair connected to and emerging from said jack, each wire of said bridge wire pair passing from said jack and through a respective channel in said body, an electrical connection being formed between said telephone wire pair and said bridge wire pair when said line plug and said jack are inserted into their respective receptacles; and
    a connector receptacle in fluid communication with said respective channels for selectively receiving a connector having a pair of terminal strips, each of which, upon insertion of said connector into said connector receptacle, electrically and mechanically connects to a respective one wire of said bridge wire pair for selective connection of a telephone device wire pair to said bridge through said connector so as to connect said device wire pair to said telephone line wire pair through said bridge wire pair.

17. The bridge of claim 16, wherein said connector is selectively insertable into and removable from said bridge.

18. The bridge of claim 16, wherein said connector is an insulation displacement connector.

19. The bridge of claim 18, wherein said insulation displacement connector is a mini-rocker type insulation displacement connector.

20. The bridge of claim 16, wherein said bridge has a length dimension, a width dimension and a height dimension, and wherein said bridge comprises a plurality of connectors oriented along said length dimension, at least one connector being offset from said bridge body along said height dimension relative to the remainder of said plurality of connectors.

21. A customer bridge comprising:
    a body;
    a first socket disposed in said body for receiving a first wire pair;
    at least two connector sockets disposed in said body, each of said two connector sockets having therein a removable connector for receiving a device wire pair;
    a connecting wire pair having a first section and a second section, said first section being disposed in said body adjacent each of said two connector sockets and extending out from said body; and
    a test socket disposed in said body for selectively receiving said second section of said connecting wire pair and coupling said connecting wire pair to said first wire pair inserted in said first socket, such that when a device wire pair is inserted in one of said at least two connectors said device wire pair is coupled to said first wire pair;
    wherein each of said at least two connector sockets are dimensioned and shaped to receive an insulation displacement connector having a terminal strip pair, and wherein when said insulation displacement connector is inserted into one of said at least two removable connector sockets, each terminal of said terminal pair couples with a respective one wire of said connecting wire pair.

22. A customer bridge comprising:
    a bridge body, said body housing on one side thereof a 645-type line plug receptacle having a 645 line plug insertable therein, a telephone line wire pair connected to and emerging from said line plug;
    an RJ-11 type jack receptacle housed on an opposite side of said body and having an RJ-11 type jack insertable therein, a bridge wire pair connected to and emerging from said jack, each wire of said bridge wire pair passing from said jack and through a respective channel in said body, an electrical connection being formed between said telephone wire pair and said bridge wire pair when said line plug and said jack are inserted into their respective receptacles; and
    a connector receptacle in fluid communication with said respective channels for selectively receiving a connector having a pair of terminal strips, each of which, upon insertion of said connector into said connector receptacle, electrically and mechanically connects to a respective one wire of said bridge wire pair for selective connection of a telephone device wire pair to said bridge through said connector so as to connect said device wire pair to said telephone line wire pair through said bridge wire pair;
    wherein said connector is an insulation displacement connector.

23. The bridge of claim 22, wherein said insulation displacement connector is a mini-rocker type insulation displacement connector.

24. A customer bridge comprising:
    a bridge body, said body housing on one side thereof a line plug receptacle having a line plug insertable therein, a telephone line wire pair connected to and emerging from said line plug;
    a jack receptacle housed on an opposite side of said body and having a jack insertable therein, a bridge wire pair connected to and emerging from said jack, each wire of said bridge wire pair passing from said jack and through a respective channel in said body, an electrical connection being formed between said telephone wire pair and said bridge wire pair when said line plug and said jack are inserted into their respective receptacles; and
    a connector receptacle in fluid communication with said respective channels for selectively receiving a connector having a pair of terminal strips, each of which, upon insertion of said connector into said connector receptacle, electrically and mechanically connects to a respective one wire of said bridge wire pair for selective connection of a telephone device wire pair to said bridge through said connector so as to connect said device wire pair to said telephone line wire pair through said bridge wire pair;
    wherein said connector is an insulation displacement connector.

25. The bridge of claim 24, wherein said insulation displacement connector is a mini-rocker type insulation displacement connector.

* * * * *